(No Model.)
W. B. MANN.
FLEXIBLE SHAFT.
No. 369,865. Patented Sept. 13, 1887.
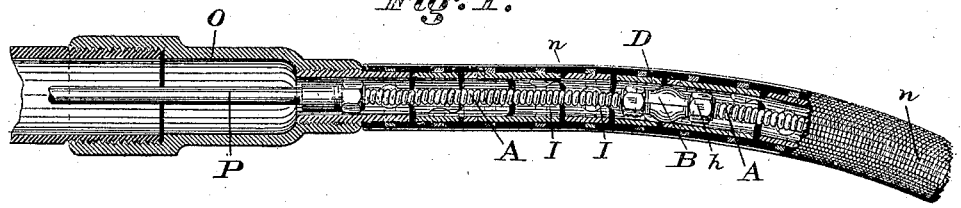
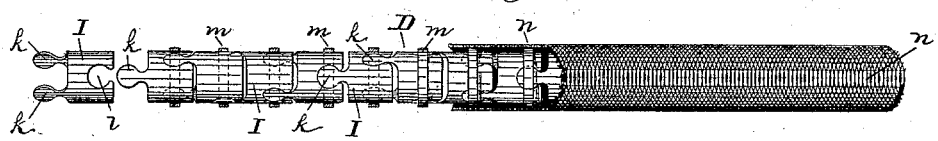
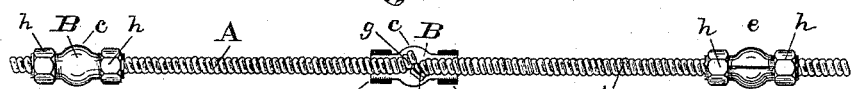
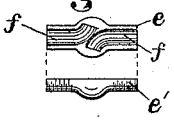
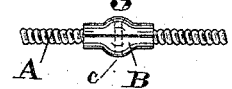
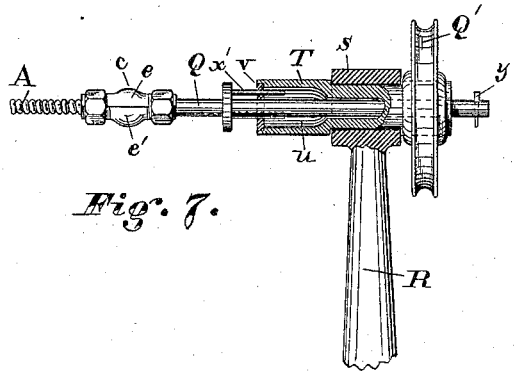
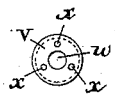
Witnesses
Edward A. Osse,
John E. Morris
Inventor:
Wm B. Mann
By his Attorney
Chas B. Mann

UNITED STATES PATENT OFFICE.

WILLIAM B. MANN, OF BALTIMORE, MARYLAND.

FLEXIBLE SHAFT.

SPECIFICATION forming part of Letters Patent No. 369,865, dated September 13, 1887.

Application filed April 20, 1887. Serial No. 235,444. (No model.)

*To all whom it may concern:*

Be it known that I, WILLIAM B. MANN, a citizen of the United States, residing at Baltimore, in the State of Maryland, have invented certain new and useful Improvements in Flexible Shafts for Dental Engines, of which the following is a specification.

My invention relates to a combined flexible shaft and flexible sheath, such as are employed in connection with hand-pieces to impart rotary motion to a tool-holder for dental engines. The object of this class of devices is to enable the operator to readily change or vary the angle or position of the hand-piece and working-tool relatively to the prime driving-shaft without affecting or interrupting the transmission of the driving-power.

One object of my invention is to provide a flexible shaft with guards located along its length at short intervals in such manner that they and not the shaft will come in contact with the sheath, and thereby serve to reduce friction between the shaft and sheath and protect the shaft from wear.

A further object is to provide for a flexible shaft a metallic sheath, or, in other words, a jointed metallic tubular sheath. I also provide an improved connection between the prime driving-shaft to which the flexible shaft is attached and the driving-pulley, whereby said prime driving-shaft may have a limited endwise movement freely through the pulley.

The invention is illustrated in the accompanying drawings, in which Figure 1 is a view, mostly in section, of the sheath, flexible shaft, and part of the hand-piece. Fig. 2 is a side view showing a portion of the finished sheath as it appears on the exterior, a portion of the metallic tubular joints with the rings which confine the joints together, another portion of said tubular joints in which the confining-rings are shown in section, and one tubular joint disconnected. Fig. 3 is a view of a short portion of the flexible shaft. Fig. 4 shows the two halves of the flexible-shaft coupling. Fig. 5 shows an end view of the coupling. Fig. 6 shows a modification in the means for uniting the two halves of the coupling. Figs. 7 and 8 show the improved connection between the prime driver-shaft and driving-pulley.

The flexible shaft is shown in Figs. 1 and 3. The letter A designates short sections of spiral wire. In practice for a dental engine I prefer these sections to be from three to five inches long; but the section length may vary, and may be more or less than here stated. Any desired number of these sections of spiral wire are united by rigid couplings B. By thus making a lengthy spiral wire shaft of short sections and rigidly coupling the sections together several advantages result. The greatest degree of flexibility is obtained without a tendency to kink. While as thoroughly flexible as the single continuous spiral wire heretofore used, this device is more rigid under torsional strain. The rigid metal couplings located at short intervals along the length of the spiral wire lessen the vibration and render the spiral wire more enduring; and, finally, when the spiral wire breaks, instead of an entire new shaft being necessary, the break is readily repaired by the insertion of a new section.

The couplings B have a protuberance or swell, $c$, which is larger than any other part either of the shaft or the coupling. These swells, it will be seen, are the only parts of the flexible shaft which come in contact with the inner wall of the sheath D. They constitute guards for the shaft, being the sole bearing-points of the flexible shaft on the sheath. I may therefore use swell-guards on the flexible driving-shaft irrespective of employing them to serve also as couplings to unite short sections of shaft. By their use the friction of a flexible shaft turning in a sheath is greatly reduced, and the spiral part A, or that part between the guards or swells, is protected from wear. It will be seen, therefore, that the swell-guards $c$ are useful on any kind of a flexible driving-shaft extending through a sheath; and my invention is not limited to the combination of these guards with a spiral-wire shaft, nor to swell-guards when made as a coupling. The guards $c$ comprise a feature of my invention when made as a coupling to unite sections of a flexible driving-shaft, and said guards are also a feature of my invention when combined with a flexible driving-shaft and a sheath, irrespective of the couplings and without regard to the flexible shaft being composed of a number of short sections or made of a single continuous piece.

The couplings are made in two pieces, $e\ e'$, each piece forming one half. The flat side of each half of the coupling has two curved grooves, $f$, and the ends $g$ of the spiral-wire sections fit in these curved grooves, as shown in Fig. 3. The two halves $e\ e'$ clamp the said ends $g$ of the sections A, and thereby the sections are united or held together. The two halves of the coupling B may be fastened together in any suitable way. Two plans for this purpose are here shown. One is to provide the ends of the two halves with a screw-thread and employ at each end a nut or screw-collar, $h$, to surround the said threaded ends, and thus hold the two halves together. Another way (see Fig. 6) is to bore through the center of the two halves and use a screw, pin, or rivet, to be inserted in the said bore, and thereby fasten the halves together.

The sheath D is composed of short tubular metallic joints suitably united, and may be covered or not, as desired. Each sheath-joint I has at one end two rounded knuckle-lugs, $k$, and at the opposite end two correspondingly-shaped notches or sockets, $l$. The knuckle-lugs $k$ of each joint fit in the notches or sockets $l$ of the adjacent joint, as shown in Fig. 2, and are confined or kept in place by a ring, $m$, which encircles and fits closely around the joint. The ring $m$ simply prevents the knuckle-lugs $k$ disengaging from the sockets $l$. A covering or jacket, $n$, of any suitable material, may surround the metal joints, and some covering is preferred, though not essential. I have used for this purpose and found very satisfactory a braided-thread covering, (shown at $n$ in the drawings,) put on by such machines as are employed to cover whips.

A feature of the tubular metallic jointed sheath is that the knuckle-lugs $k$ of each joint I which are at one end occupy a plane or position which is just one-eighth of a turn from that occupied by the sockets $l$ at the other end of the same joint. This will be understood by an inspection of Fig. 2, where, if the successive joints made by a lug, $k$, fitting in a socket, $l$, are noted, it will be seen that eight joints are embraced in one turn of the sheath. This feature greatly favors the flexibility of the sheath. Instead of having the joints one-eighth of a turn apart, they might with advantage be one-sixth of a turn. The object is to have the joints occur at an interval of less than one-quarter turn, inasmuch as a one-quarter turn does not afford the desired flexibility. The hand-piece, of which only a portion, O, is shown, is attached, as usual, to the sheath D, and the spindle P of the tool-holder is attached, as usual, to the flexible shaft.

The attachment of the flexible shaft to the prime driving-shaft Q and the connection between the latter and the driving-pulley Q' are shown in Fig. 7.

The letter R designates the standard of a dental engine, having a bearing, $s$. A hollow shaft, T, turns in this bearing, and has attached to it the driving-pulley Q'. At one end the said hollow shaft has a recess, $u$, and a disk-plate, $v$, fastened at the end, closes the recess. This disk-plate has a central hole, $w$, for the prime driving-shaft Q, and also one or more smaller holes, $x$. In the present instance three small holes $x$ are employed. Attached to the prime driving-shaft Q is a pin, $x'$, which extends in a direction lengthwise of the said shaft, and this pin fits loosely in one of the small holes $x$ in the said disk-plate and is movable endwise therein. It is immaterial how the pin $x'$ is attached to the shaft. The only essential thing is that it shall have a portion which extends in a direction lengthwise of the shaft. It is obvious that the pin may be attached in various ways. In the present instance the pin is fixed to a disk which is secured on the shaft. The end of the prime driving-shaft has a stop device—such as a collar or pin, $y$. It will be seen that the pin $x'$ on the shaft and the disk-plate $v$, with pin-hole $x$ on the part to which the driving-pulley is attached, insures the rotation of the prime driving-shaft, while at the same time providing for it a limited endwise movement.

Having described my invention, I claim and desire to secure by Letters Patent of the United States—

1. The combination of a hand-piece, a flexible sheath, and a flexible driving-shaft provided with swell-guards $c$, located at short intervals along its length, said guards being larger than any other part of the shaft, and thereby constituting the sole bearing-points of the shaft on the sheath.

2. The combination of a jointed metallic sheath and a flexible driving-shaft extending through the sheath and provided with swell-guards located at intervals along its length.

3. The combination of a flexible driving-shaft and a metallic sheath composed of tubular joints, each of which is provided at one end with two knuckle-lugs, $k$, and at the other end with two sockets, whereby the joints are united and interlocked.

4. The combination of a flexible driving-shaft and a metallic sheath composed of tubular joints, each of which is provided at one end with two knuckle-lugs, $k$, and at the other end with two sockets and an encircling ring.

5. The combination of a flexible shaft, a driving-pulley, Q', attached to a hollow shaft, T, provided with a plate having a pin-hole, $x$, and a prime driving-shaft, Q, having an attached pin, $x'$, extending in a direction lengthwise thereof and fitting loosely in the said pin-hole, for the purpose set forth.

In testimony whereof I affix my signature in the presence of two witnesses.

WM. B. MANN.

Witnesses:
JOHN E. MORRIS,
JNO. T. MADDOX.